United States Patent [19]

Cordia

[11] 4,197,880
[45] Apr. 15, 1980

[54] SEALING AND INSULATING ARTICLE AND METHOD

[75] Inventor: Johannes M. Cordia, Pellenberg, Belgium

[73] Assignee: N.V. Raychem S.A., Kessel-Lo, Belgium

[21] Appl. No.: 847,817

[22] Filed: Nov. 2, 1977

[30] Foreign Application Priority Data

Nov. 5, 1976 [GB] United Kingdom ............... 46172/76

[51] Int. Cl.$^2$ ........................ F16L 55/16; B29H 5/01
[52] U.S. Cl. ..................................... 138/99; 138/178; 156/110 R
[58] Field of Search ..................... 138/97, 98, 99, 178; 427/373; 428/36, 913, 315; 156/110 R

[56] References Cited

U.S. PATENT DOCUMENTS

| | | | |
|---|---|---|---|
| 3,379,218 | 4/1968 | Conde | 138/99 |
| 3,531,345 | 9/1970 | Torosian | 138/99 |
| 3,542,077 | 11/1970 | Muchmore | 138/99 |
| 3,770,556 | 11/1973 | Evans et al. | 138/99 |
| 3,982,564 | 9/1976 | Clabburn et al. | 138/99 |
| 4,034,131 | 7/1977 | Rhoads | 428/315 |
| 4,038,446 | 7/1977 | Rhoads | 428/315 |
| 4,055,613 | 10/1977 | Kapral | 428/315 |

Primary Examiner—Houston S. Bell
Attorney, Agent, or Firm—Lyon & Lyon

[57] ABSTRACT

A heat-recoverable article for sealing or insulating the surface of a substrate comprises a dimensionally heat-recoverable member and heat expansible material positioned in the direction of recovery thereof so that when heat is applied the material expands and is urged towards the surface by the recoverable member. The recoverable member may be made from a plastics material or a metal alloy possessing memory properties but is preferably made from a resiliently recoverable member held in a deformed state by fusible retaining means, which in some cases may be made from the heat expansible material itself. Especially preferred are longitudinally split tubular heat-recoverable members in which the fusible retaining means comprises a hot melt adhesive positioned between the overlapping edges. The heat expansible material is typically employed as a layer of polymeric material containing a dissolved or dispersed foaming agent but, in other cases, may comprise a laminate of a layer of foamable material sandwiched between two layers of a mastic or hot melt adhesive.

18 Claims, 8 Drawing Figures

SEALING AND INSULATING ARTICLE AND METHOD

BACKGROUND TO THE INVENTION

This invention relates to heat-recoverable articles, and more particularly to a heat-recoverable article suitable for use, for example in sealing or insulating a surface of a substrate.

Frequently fluid-carrying conduits laid underground, especially gas pipes, become damaged either by corrosion, cracking or failure of the joint between adjacent sections of pipe, leading to leakage of the fluid from the conduit. A system has been proposed for internal sealing of damaged pipes which utilises an expandable rubber bag or "pig" to press a thin flexible non-resilient metal sheet coated with an ambient-temperature curing adjesive against the internal surface of the pipe. However, this system suffers from the disadvantage that it is difficult to obtain a good seal to an uneven surface.

In recent years increasing attention has been paid to the use of heat-recoverable articles exhibiting the property of elastic memory, for providing environmental insulation to substrates such as fluid-carrying conduits, pipelines and the like. An article having this property is one which has been deformed from an original heat-stable dimensional form into a different heat-unstable form. While this article is maintained below a certain temperature, it will retain its unstable form, but when it is heated to above this temperature, termed the recovery temperature, it will recover towards its original form. However, the term "heat-recoverable" as used herein also includes an article which, on heating, adopts a new configuration, even if it has not been previously deformed.

In British Patent No. 1,062,870 to Raychem Corporation there is disclosed and claimed a heat-recoverable article comprising a resilient member in tubular form, the tube being circumferentially interrupted, for example longitudinally split, to permit changes in the radius thereof and a fusible member which retains the resilient member in a dimensionally unstable form, the arrangement and the material of the members being such that at least a part of the fusible member is positioned in the path of recovery of the resilient member, and that upon raising the temperature of the fusible member to a temperature at which is insufficiently rigid to retain the resilient member in its dimensionally unstable form, the resilient member recovers towards its stable form and thereby urges at least some of the material of the fusible member in the direction of recovery. It is also disclosed that an article comprising a tubular radially expansible resilient member with a surrounding fusible member is particularly suitable for the lining of tubular members such as pipes.

SUMMARY OF THE INVENTION

According to the present invention there is provided an improved heat-recoverable article, suitable for sealing or insulating a surface of a substrate, which comprises a heat-recoverable member and heat expansible material positioned in the direction of recovery of the heat-recoverable member.

DETAILED DESCRIPTION OF THE INVENTION

In one embodiment the present invention accordingly provides a heat-recoverable article which comprises a radially heat-recoverable tubular member and a layer of a heat expansible material positioned in the direction of recovery of the tubular member, the arrangement being such that upon heating the article, the heat expansible material expands and the recoverable member recovers, urging the heat expansible material in the direction of recovery.

The present invention also provides a method of sealing or insulating a surface of a substrate which comprises positioning the heat-recoverable article of the invention adjacent to the surface to be sealed or insulated, and heating the article to cause the heat expansible material to expand and the recoverable member to recover thereby urging the heat expansible material into engagement with the surface.

By a "heat expansible material" in this specification there is meant a material or a composition, the volume occupied by which is increased upon heating, especially a material which is capable of developing pores or foaming on heating so as to produce an expanded three-dimensional structure. It will be understood that the expansible material can be caused to expand upon heating to a temperature which is below, at or above the recovery temperature of the tubular member and may include materials which have been at least partially heat expanded before being applied to the tubular member of the invention. In certain applications, the material may be fully expanded before being applied to the tubular member. The term "heat expansible" as used herein also includes, for convenience, such materials which have been partially or fully expanded so as to increase their bulk volume.

The heat expansible material may be a foamable material, such as, for example, a polymeric material having dissolved or dispersed therein one or more foaming agents. Particularly preferred are polymeric materials which become fusible or which flow upon heating, for example there may be used a blend of a mastic or a hot melt adhesive together with a foaming agent.

Among suitable mastics there may be mentioned, for example, those based on butyl and isobutylene rubbers, modified with suitable materials known in the art, amorphous polypropylene and viscous blends of ethylene vinyl acetate. Among suitable hot melt adhesives there may be mentioned for example polyamide materials, ethylene vinyl acetate copolymers and terpolymers (with or without incorporated paraffin waxes) and polyesters. Also suitable are curable adhesives which melt and flow upon heating, but which are not afterwards hot meltable. Of the foaming agents there may be mentioned chemical foaming agents which liberate a gas on heating, for example peroxides, isocyanurates and carbonates and physical foaming agents such as n-pentane. In a particularly preferred embodiment the heat expansible material comprises particles of a foamable polymer material, for example polystyrene beads or Saran (Trade Mark) emulsions, dispersed in a fusible or flowable polymeric matrix, for example a mastic or hot melt adhesive as described above. The mastic or hot melt adhesive may be in intimate admixture with the foaming agent, or alternatively the expansible material may be a laminate wherein for example a layer of foamable polystyrene beads is sandwiched between two layers of a mastic or hot melt adhesive. The foamable layer being present in a quantity which is sufficient to form an effective seal of a pipe but, preferably, insufficient to block it.

The heat-recoverable member may comprise a plastics material or memory metal to which the property of independent dimensional heat instability (elastic memory) has been imparted but preferably it comprises a resiliently recoverable member which is held in a resiliently recoverable configuration at ambient temperatures by a fusible retaining means which at higher temperature becomes insufficiently strong to maintain the resilient member in its recoverable configuration. The heat-recoverable member may for example be a tubular member which can expand so as to increase its cross-sectional area or which can shrink so as to decrease its cross-sectional area. For example, where a resiliently recoverable tubular member is used it may be held in a radially compressed or expanded state by the fusible retaining means.

In one preferred embodiment of the present invention there is provided a heat-recoverable article which comprises a resilient tubular member, the tubular member being circumferentially interrupted to permit changes in the radius thereof, a fusible retaining means retaining the resilient tubular member in a state of radial compression, and a layer of heat expansible sealing material, the arrangement being such that on raising the temperature of the article to the recovery temperature, the heat expansible sealing material expands, the fusible retaining means becomes insufficiently rigid to retain the resilient tubular member in its compressed state and the resilient tubular member expands urging the layer of heat expansible sealing material in a radially outward direction.

The resilient tubular member may be formed from a resilient plastics material, but preferably it is formed from a metal, for example steel, aluminium, or beryllium copper, which has been heat treated to render it resilient. Preferably a sheet of metal is rolled into e.g. a loose tubular coil, heat treated, then rolled into a tighter or a looser coil and held in the tightened or loosened configuration by a fusible retaining means.

The amount of recovery or snap back towards the original configuration for a given thickness of material is determined by the nature of the material chosen, for example, mild steel has a lower elastic limit than spring steel and will exhibit a lower degree of recoverability. The resilient tubular member in its heat-recoverable state is preferably compressed or expanded such that its longitudinal edges overlap.

As previously mentioned, the heat-recoverable member may also be manufactured from a material which is capable of having the property of elastic memory imparted thereto. Plastics materials which are capable of being rendered heat-recoverable include, for example, thermoplastics which have been crosslinked by irradiation with $\beta$ or $\gamma$ rays or by chemical means or by a combination thereof.

Materials which may be rendered heat-recoverable and methods for making them heat-recoverable are described in U.S. Pat. Nos. 2,027,962, 3,086,242 and in 3,957,372, the disclosures of which are incorporated herein by reference. Plastics of special interest which are capable of being rendered heat-recoverable include polyolefins, especially polyethylene, copolymers of ethylene and vinyl acetate, ethylene and ethyl acrylate, halopolymers especially polyvinyl chloride, polyvinylidene chloride and polymers incorporating units derived from hexafluoroethylene and chlorotrifluoroethylene, and rubbers such as ethylene propylene rubber and silicone rubber, which may be used in a blend with crystalline materials such as polyolefins.

Of the memory metals suitable for the manufacture of the heat-recoverable tubular member of the present invention there may especially be mentioned alloys which exhibit a martensitic transition when passing through a narrow temperature range. Such memory alloys and uses for them are described for example in the book "Shape Memory Effects in Alloys" (Jeff Perkins, Plenum Press, New York and London 1975). Among suitable alloys for use in the invention there may be mentioned various alloys of titanium and nickel described, for example, in U.S. Pat. Nos. 3,174,851, 3,351,463, 3,753,700, 3,759,552, British Patent Nos. 1,327,441 and 1,327,442 and NASA Publication SP 110 "55-Nitinol—The Alloy with a Memory, etc." (U.S. Government Printing Office, Washington, DC 1972).

Also various $\beta$-brass alloys have been demonstrated to exhibit the property of recoverability in for example N. Nakanishi et al *Scripta Metallurgica* 5, 433–440 (Pergamon Press 1971) and such materials may be doped to lower their transition temperatures to cryogenic regimes by known techniques. Similarly 304 stainless steel has been shown to enjoy such characteristics, E. Enami et al id at pp 36–38.

In the case where the heat-recoverable member comprises a resilient tubular member, circumferentially interrupted to permit changes in the radius thereof, which is held in its recoverable configuration at ambient temperatures by a fusible retaining means, the fusible retaining means may comprise a hot melt adhesive or crystalline thermoplastic material.

Hot melt adhesives which are suitable for the manufacture of the fusible retaining means include for example those which are listed above. Among the crystalline thermoplastic materials there may be mentioned polyolefins such as polyethylene, polypropylene, poly-1-butene and copolymers thereof such as for example ethylene vinyl acetate and ethylene ethyl acrylate. These materials are preferably non-crosslinked or so lightly crosslinked that they are fusible at the recovery temperature of the heat-recoverable article.

The functions of a fusible retaining means and a heat expansible material may be combined in a single component of the article of the invention. Thus for example a resiliently recoverable tubular member may be maintained in its recoverable configuration at ambient temperatures by a heat expansible material.

Especially where the resiliently recoverable tubular member comprises a resiliently compressed coil of sheet material, the longitudinal edges of the sheet overlap to an extent such that they also overlap when the tubular member has recovered. When the resiliently recoverable tubular member comprises a resiliently expanded coil which upon recovery decreases in cross-sectional area, preferably the longitudinal edges overlap in at least the recovered configuration. In these embodiments the fusible retaining means may comprise a patch of fusible material, for example a hot melt adhesive, positioned on at least a length of the overlap and preferably positioned over the whole length of the overlap so that on recovery, the overlap is sealed by at least a portion of the resolidified fusible retaining means.

In a further embodiment of the article of the present invention, the overlapped edges of the tubular member may be punched to provide one or more sets of aligned apertures adapted to accommodate a fusible retaining means in the form of a button, rod or thread.

In use, the heat-recoverable article of the invention is heated to weaken the fusible retaining means and cause expansion and preferably flow of the heat expansible material. The heating apparatus employed may be for example an infrared, hot air, resistive, inductive or other convenient heat source and may in certain embodiments be an integral part of the article of the invention, for example where a resistance heater is employed. In the case where the article of the invention expands on heating and is to be used as an internal seal for a pipe, the heating apparatus is advantageously adapted to be placed inside the article of the invention such that it can be moved through the pipe to locate the article and upon recovery of the article can then be withdrawn. Advantageously the heating apparatus is adapted to carry the article of the invention to the location of the pipe section to be sealed or insulated.

Although the invention has been described in relation to the sealing of pipes it may also be used to provide an extension to an existing pipe at an end thereof, for example, an expandably heat-recoverable article of the invention may be partly positioned within an end of a pipe so as to protrude therefrom and heated so that it recovers and seals against the internal wall adjacent to the end of the pipe. This embodiment may also be used to provide a seal between a blind duct and a cable passing therethrough, by positioning the heat-recoverable article partly within the duct, recovering the article into sealing engagement with the internal wall of the duct, and sealing the protruding portion of the article to the cable using, for example, a heat shrinkable sleeve. In this embodiment the heat expansible sealing material may be provided on only that portion of the heat-recoverable tubular member which is to be placed within the end of the pipe to be extended or sealed. Heat-shrinkable articles of the invention may also be used to provide an external seal or insulation for a pipe or conduit and for many other uses as will be apparent to those skilled in the art.

DETAILED DESCRIPTION OF THE DRAWINGS

Figure 6:
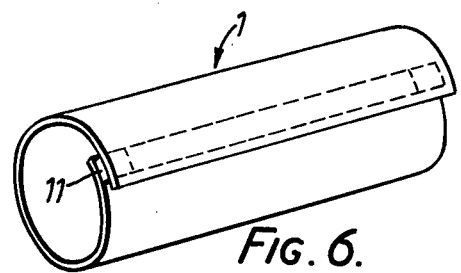
FIG. 6 is a perspective view of a third heat expansible article of the invention during a first stage of its manufacture.

Referring now to FIG. 1 there is shown a resiliently compressed tubular member of sheet material indicated generally by reference numeral 1 held in its compressed configuration by thermoplastic straps 2 and 3. It will be seen that the longitudinal edges of the compressed tubular member overlap and in an alternative embodiment shown in FIG. 6 these may be joined to retain the tubular member in its resiliently compressed configuration at ambient temperatures by a fusible retaining means comprising one or more patches of hot melt adhesive 11 or by a longitudinal strip of hot melt adhesive which extends throughout the length of the overlap.

Figure 7:
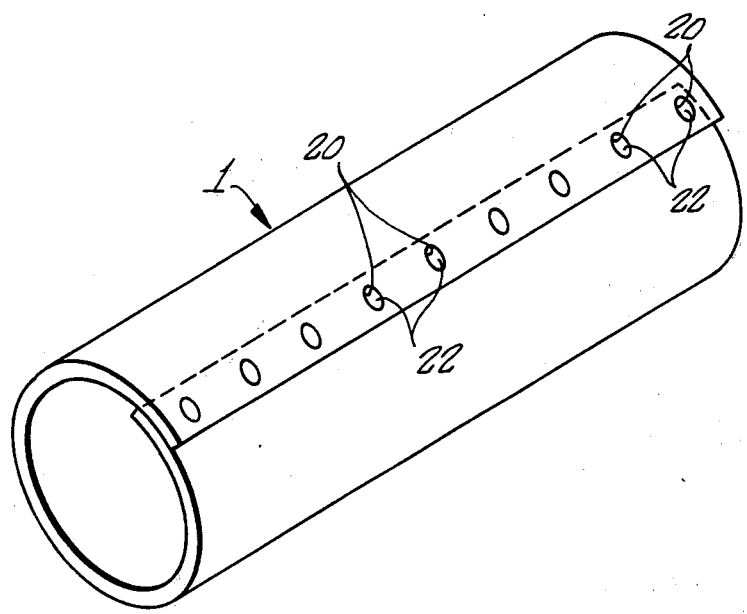
FIG. 7 is a perspective view of another heat expansible article of the present invention.

In another alternate embodiment as shown in FIG. 7, the tubular member is retained in its resiliently compressed configuration by fusible members in the form of rods 20 positioned within spaced-apart punched holes 22 positioned along overlapped edges of the tubular member 1.

Figure 1A:
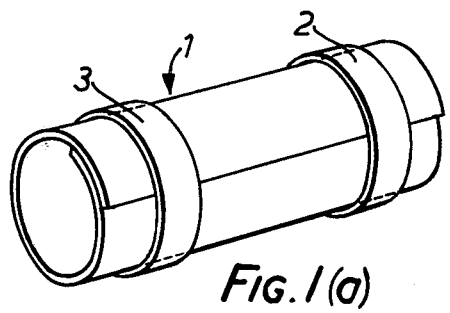
FIGS. 1(a) and 1(b) are perspective views of a heat-recoverable article of the invention during stages of its manufacture.
Figure 1B:
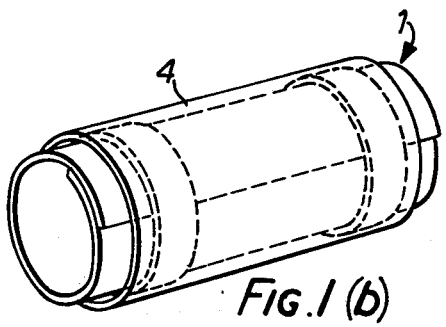

In FIG. 1(b) there is shown the tubular member indicated generally by reference numeral 1 of FIG. 1(a) with a coating of a heat expansible material 4, the heat expansible material extending over a central portion only of the tubular member 1.

Figure 2:
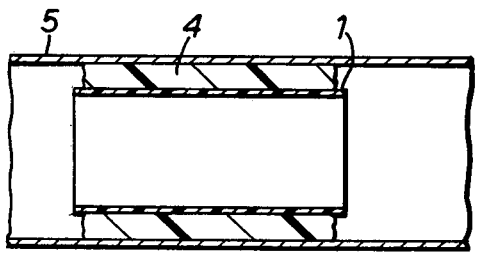
FIG. 2 is a side elevation partly in section of the article of FIG. 1(b) heat-recovered in position within a pipe.

In FIG. 2 the article of FIG. 1(b) is shown after recovery during which it has expanded radially into contact with an internal surface of a pipe 5. It will be seen that the heat expansible material 4 has expanded and flowed to fill up the space left between the recovered tubular member 1 and the pipe 5. The tubular member 1 in use preferably exerts a compressive force on the expanded sealing material 4.

Figure 3:
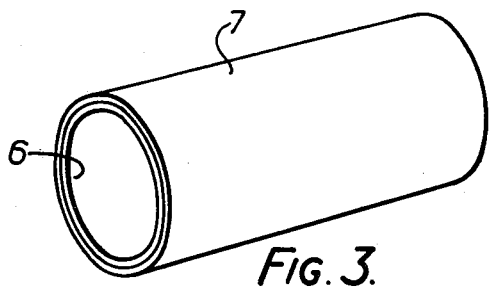
FIG. 3 is a perspective view of a second heat-recoverable article of the invention.

In FIG. 3 there is shown an article comprising an expandably heat-recoverable tubular member 6 made from a suitable plastics material, such, for example, as those listed in U.S. Pat. No. 3,086,242 and having an external coating 7 of a heat expansible sealing material. Upon heating this article the tubular member 6 increases in cross section and the sealing material 7 expands and flows.

Figure 4:
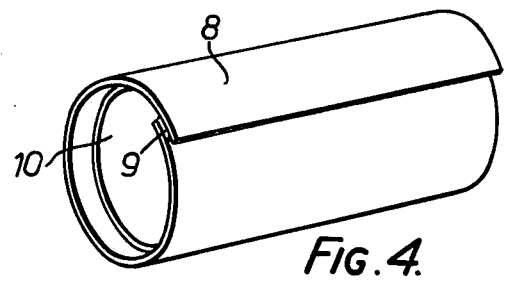
FIG. 4 is a perspective view of a heat shrinkable article of the invention.

In FIG. 4 there is shown a heat shrinkable article according to the invention. The article comprises a resiliently expanded coil of sheet material 8 held in an expanded configuration by a fusible material 9 consisting of a layer of a hot melt adhesive positioned in the overlap region of the coil. The expansible material 10 is positioned in the direction of recovery of the tubular member and comprises a heat expansible and flowable foam.

Figure 5:
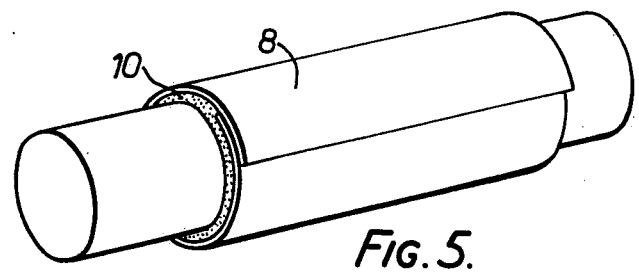
FIG. 5 is a perspective view of the article of FIG. 4 recovered about a pipe.

In FIG. 5 the article of FIG. 4 is shown heat-recovered about the external surface of a pipe.

I claim:

1. A heat-recoverable article suitable for sealing or insulating the surface of a substrate, which comprises a dimensionally heat-recoverable member and heat foamable material positioned in the direction of recovery of the heat-recoverable member.

2. A heat-recoverable article as claimed in claim 1, wherein the heat-recoverable member is a radially-recoverable tubular member.

3. A heat-recoverable article as claimed in claim 1, wherein the heat-recoverable member is made from a plastics material possessing the property of elastic memory.

4. A heat-recoverable article as claimed in claim 1, wherein the heat-recoverable member is made from a memory alloy.

5. A heat-recoverable article as claimed in claim 1, wherein the heat-recoverable member is made from a resiliently recoverable member which is held in a dimensionally unstable form by fusible retaining means.

6. A heat-recoverable article as claimed in claim 5, wherein the resiliently recoverable member comprises a tube having a longitudinal split therein.

7. A heat-recoverable article as claimed in claim 6, wherein the resiliently recoverable tube is a coil of sheet material held in a compressed configuration.

8. A heat-recoverable article as claimed in claim 6, wherein the fusible retaining means comprises a fusible material positioned between overlapped edges of the longitudinally split tube.

9. A heat-recoverable article as claimed in claim 6, wherein edges of the tube are overlapped and are held in position by fusible members positioned within spaced-apart punched holes positioned along overlapped edges of the longitudinally split tube.

10. A heat-recoverable article as claimed in claim 5, wherein the fusible retaining means comprises a hot melt adhesive or a crystalline thermoplastic material.

11. A heat-recoverable article as claimed in claim 1, wherein the heat foamable material is provided as a layer on the surface of the heat-removable member.

12. A heat-recoverable article as claimed in claim 1, wherein the heat foamable material is a polymeric material having dissolved or dispersed therein one or more foaming agents.

13. A heat-recoverable article as claimed in claim 12, wherein the polymeric material is a mastic or a hot melt adhesive.

14. A heat-recoverable article as claimed in claim 1, wherein the heat expansible material comprises a laminate of a foamable layer sandwiched between two layers of a mastic and/or a hot melt adhesive.

15. A heat-recoverable article as claimed in claim 5, wherein the heat foamable material acts as the fusible retaining means.

16. A method of sealing or insulating the surface of a substrate comprising the steps of positioning a heat-recoverable article comprising a heat-recoverable member and heat foamable material positioned in the direction of recovery of the heat-recoverable member adjacent to the surface to be sealed or insulated and heating the article to cause the heat foamable material to expand by foaming and to cause the heat-recoverable member to recover and urge the heat foamable material into engagement with the surface.

17. A heat-recoverable article as defined in claim 1 which upon application of heat expands so as to increase its cross-section.

18. A method of sealing or insulating the internal surface of a tubular substrate comprising the steps of positioning the heat-recoverable article of claim 17 in the tubular substrate adjacent to the surface to be sealed or insulated and heating the article to cause the heat foamable material to expand by foaming and to cause the heat-recoverable material to expand and urge the heat foamable material into engagement with the internal surface of the tubular member.

* * * * *